United States Patent
Li (10) Patent No.: US 9,359,248 B1
(45) Date of Patent: Jun. 7, 2016

(54) LOW-TEMPERATURE SEALING GLASS FRIT AND METHOD FOR PREPARING COMPOSITE FILLER IN GLASS FRIT

(71) Applicants: Shanghai Tianma AM-OLED Co., Ltd., Shanghai (CN); Tianma Micro-Electronics Co., Ltd., Shenzhen (CN)

(72) Inventor: Dandan Li, Shanghai (CN)

(73) Assignees: SHANGHAI TIANMA AM-OLED CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 14/686,564

(22) Filed: Apr. 14, 2015

(30) Foreign Application Priority Data

Dec. 26, 2014 (CN) .......................... 2014 1 0838765

(51) Int. Cl.
| | |
|---|---|
| *C03C 8/14* | (2006.01) |
| *C03C 8/24* | (2006.01) |
| *C03C 1/00* | (2006.01) |
| *C08K 3/36* | (2006.01) |
| *C08K 3/22* | (2006.01) |

(52) U.S. Cl.
CPC ... *C03C 8/24* (2013.01); *C03C 1/00* (2013.01); *C08K 3/22* (2013.01); *C08K 3/36* (2013.01); *C08K 2003/222* (2013.01); *C08K 2003/2203* (2013.01); *C08K 2003/2227* (2013.01); *C08K 2003/2244* (2013.01); *C08K 2003/2258* (2013.01); *C08K 2003/2265* (2013.01)

(58) Field of Classification Search
CPC ................ C03C 8/14; C03C 8/18; C03C 8/20
USPC .......................................... 501/17, 18, 19, 21
See application file for complete search history.

(56) References Cited

U.S. PATENT DOCUMENTS

| | | | | | |
|---|---|---|---|---|---|
| 5,075,261 | A | * | 12/1991 | Yamanaka | .............. C03C 8/245 501/15 |
| 5,694,503 | A | * | 12/1997 | Fleming | ............... G02B 6/0218 385/37 |
| 6,127,005 | A | * | 10/2000 | Lehman | .................. C03C 17/02 427/126.3 |
| 6,187,700 | B1 | * | 2/2001 | Merkel | .................... C04B 35/01 501/102 |
| 6,498,116 | B1 | * | 12/2002 | Lehman | .................. C03C 17/02 501/14 |

(Continued)

FOREIGN PATENT DOCUMENTS

CN           101066840 B          8/2010

OTHER PUBLICATIONS

Kanamori et al. Low-temperature sintering of ZrW2O8—SiO2 by spark plasma sintering. J Mater Sci (2009) 44:855-860.*

*Primary Examiner* — Noah Wiese
(74) *Attorney, Agent, or Firm* — Anova Law Group, PLLC (57) ABSTRACT

The invention discloses a lower-temperature sealing glass frit and a method for preparing a composite filler in the glass frit. The lower-temperature sealing glass frit includes a glass powder and a negative thermal expansion composite filler with an adjustable thermal expansion coefficient. The thermal expansion coefficient of the low-temperature sealing glass frit into which the composite material and the glass powder is mixed can be adjustable so that the thermal expansion coefficient of the low-temperature sealing glass frit can match the thermal expansion coefficient of glass substrates packaging an OLED device to thereby improve the yield of the packaged OLED device.

20 Claims, 4 Drawing Sheets

(56) References Cited

U.S. PATENT DOCUMENTS 7,569,505 B2 * 8/2009 Besinger ................. C03C 3/068
  427/126.2
8,025,975 B2 * 9/2011 Botelho ................... C03C 8/14
  428/323
2009/0155555 A1 * 6/2009 Botelho ................... C03C 8/14
  428/210

* cited by examiner

LOW-TEMPERATURE SEALING GLASS FRIT AND METHOD FOR PREPARING COMPOSITE FILLER IN GLASS FRIT

CROSS-REFERENCES TO RELATED APPLICATIONS

This application claims the benefit of priority to Chinese Patent Application No. 201410838765.2, filed with the Chinese Patent Office on Dec. 26, 2014 and entitled "LOW-TEMPERATURE SEALING GLASS FRIT AND METHOD FOR PREPARING COMPOSITE FILLER IN GLASS FRIT", the content of which is incorporated herein by reference in its entirety.

BACKGROUND OF THE INVENTION

Figure 1:
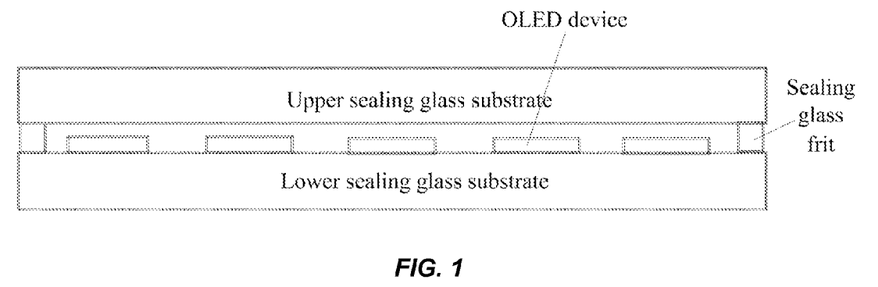
FIG. 1 illustrates a schematic diagram of packaging of an OLED device.

In a process of fabricating an OLED display panel, in order to ensure the lifetime of an OLED device, an organic layer in the OLED device is typically insulated from vapor and oxygen in ambient air, and in the related art, an area to be sealed enclosed by an upper sealing glass substrate and a lower sealing glass substrate for packaging the OLED device is filled with a sealing glass frit (see FIG. 1), and then the sealing glass frit is heated by a moving laser beam and melted to make the OLED device airtight, where the sealing glass frit is typically a low-temperature sealing glass frit.

The thermal expansion coefficient of the sealing glass substrates of the OLED device is in the range between $30 \times 10^{-7}/°$C. and $45 \times 10^{-7}/°$C., and the sealing glass frit is a mixture of glass powder with a low melting point and a low thermal expansion coefficient and a filler. If the thermal expansion coefficient of the sealing glass frit is significantly different from the thermal expansion coefficient of the sealing glass substrates, then warping and breakage may occur when the sealing glass substrates are sealed by the sealing glass frit, or breakage may occur in the sealing glass substrates packaging the OLED device being illuminated by intensive light, thus resulting in a low yield of the packaged OLED device.

Generally there is a high positive thermal expansion coefficient of the glass powder, and in order to improve the yield of the packaged OLED device, typically a material with a negative thermal expansion coefficient is selected as the filler, e.g., eucryptite, cordierite or another negative thermal expansion material. However it may be difficult to control the thermal expansion coefficient of the sealing glass frit into which such a filler and the glass powder is mixed, and micro-breakage may tend to occur at the sites where the OLED device is packaged by the sealing glass frit including the filler, thus degrading the strength of the sealing material as a whole.

Consequently, it may be difficult to control the thermal expansion coefficient of the sealing glass frit in the related art because the filler is a negative thermal expansion material, which may degrade the yield of the packaged OLED device.

BRIEF SUMMARY OF THE INVENTION

In view of this, embodiments of the present invention provide a low-temperature sealing glass frit including a glass powder and a negative thermal expansion composite filler with an adjustable thermal expansion coefficient.

An embodiment of the invention provides a method for preparing a composite filler of the low-temperature sealing glass frit above, the method including: preparing a mixed wet raw material from zirconium tungstate and silicon dioxide at preset volume fractions resolved in an organic solvent through physical deposition; or preparing a mixed wet raw material from zirconium tungstate and silicon dioxide at preset volume fractions, and at least one of cordierite or eucryptite resolved in the organic solvent through physical deposition; and pre-sintering the mixed wet raw material at a first preset temperature for 4 to 6 hours and then sintering it at a second preset temperature for 1 to 3 hours into the composite filler, wherein the first preset temperature is in the range from 400° C. to 700° C., and the second preset temperature is in the range from 1000° C. to 1200° C.

The low-temperature sealing glass frit above, or the composite material prepared in the method above, according to the embodiments of the invention can be used as a negative thermal expansion composite filler with an adjustable thermal expansion coefficient, and the thermal expansion coefficient of the low-temperature sealing glass frit mixed into which the composite filler and the glass powder is mixed can be adjustable, so that the thermal expansion coefficient of the low-temperature sealing glass frit can match with the thermal expansion coefficient of glass substrates packaging an OLED device to thereby improve the yield of the packaged OLED device.

BRIEF DESCRIPTION OF THE DRAWINGS

In order to make the technical solutions according the embodiments of the invention more apparent, the drawings to which reference is made in the description of the embodiments will be described below, and apparently the drawings in the following description illustrate merely some of the embodiments of the invention, and those ordinarily skilled in the art can derive other drawings from these drawings without any inventive effort.

DETAILED DESCRIPTION OF THE PREFERRED EMBODIMENTS

In order to make the objects, technical solutions and advantages of the invention more apparent, the invention will be described below in further details with reference to the drawings. Specific embodiments are described below. Those skilled in the art with access to the present disclosure will recognize that other low-temperature sealing glass frit and methods for preparing composite fillers in glass frit can be made within the scope of the present invention.

Experiments demonstrated that β-eucryptite, tridymite ($SiO_2$ with a linear expansion coefficient of $-4.3 \times 10^{-6}$), cristobalite ($SiO_2$ with a linear expansion coefficient of $-1.7 \times 10^{-6}$), quartz ($SiO_2$ with a linear expansion coefficient of $-12 \times 10^{-6}$), a series of cordierites, a series of perovskites and other negative thermal expansion materials are used as a filler in the related art because all of β-eucryptite, tridymite, cristobalite, quartz, a series of cordierite and a series of cordierite perovskites are anisotropic negative thermal expansion materials so that it may be difficult to control the thermal expansion coefficient of a sealing glass frit. Crystals in the anisotropic negative thermal expansion material shrink along one or two axles and expand along the other axles at rising temperature, so that the material expands as a whole differently in different directions. Thus the thermal expansion coefficient of the sealing glass frit into which the anisotropic negative thermal expansion material and glass powder is mixed will not vary regularly so that it is may be difficult to control the thermal expansion coefficient of the sealing glass frit including the filler which is the anisotropic negative thermal expansion material, and micro-breakage may occur at the sites where the OLED is packaged by the sealing glass frit including such a filler, thus degrading the strength of the sealing material as a whole.

Based on experiments conducted by the inventor, an embodiment of the invention provides a negative thermal expansion composite material with an adjustable thermal expansion coefficient varying regularly with a variable proportion of components in the composite material, and the composite material can be used as a filler of a low-temperature sealing glass frit to thereby make the thermal expansion coefficient of the low-temperature sealing glass frit adjustable as a whole.

In order to improve the yield of a packaged OLED device, for glass substrates with different thermal expansion coefficients to package the OLED device, a low-temperature sealing glass frit with a thermal expansion coefficient matching with the thermal expansion coefficient of the glass substrates packaging the OLED device can be prepared to avoid the problem in the related art, in which the thermal expansion coefficient of the sealing glass frit is significantly different from the thermal expansion coefficient of the sealing glass substrate, due to which warping and breakage may occur when the sealing glass substrates are sealed by the sealing glass frit, or breakage may occur in the sealing glass substrates packaging the OLED device being illuminated by intensive light. The low-temperature sealing glass frit with an ideal thermal expansion coefficient can be prepared by adjusting the mass fraction of the composite filler according to the embodiment of the invention in the mixture of the low-temperature sealing glass frit. For this purpose, an embodiment of the invention further provides a method for preparing a composite filler for a low-temperature sealing glass frit.

A composite filler, and a low-temperature sealing glass frit including the composite filler, according to embodiments of the invention will be described in details below.

A method for preparing a negative thermal expansion composite filler according to an embodiment of the invention can be embodied in a number of different processes:

In a first process, a composite material C with a negative thermal expansion coefficient is prepared from raw materials including a negative thermal expansion material A and a positive thermal expansion material B under certain chemical reaction conditions, but this negative thermal expansion composite material is prepared from a chemical reaction between thermal expansion material in a negative expansion phase and thermal expansion material in a positive expansion phase at high temperature, and there is a significant thermal hysteresis in the thermal behavior of the composite material into which the thermal expansion material in the negative expansion phase and the thermal expansion material in the positive expansion phase are combined so that breakage and pores may occur with the negative thermal expansion composite material being used in repeated thermal cycles, thus degrading the quality of the negative thermal expansion composite material. Moreover, there may be a high positive expansion coefficient of the composite material into which the thermal expansion materials in the negative expansion phase and the thermal expansion material in the positive expansion phase are combined, so it is typically inadvisable to select such a composite material as a composite filler.

In a second process, a composite filler E with a negative thermal expansion coefficient is prepared from raw materials including a negative thermal expansion material A and a negative thermal expansion material D under certain chemical reaction conditions, and the volume fractions of the two components, the negative thermal expansion material A and the negative thermal expansion material D, in the composite filler E can be adjusted to thereby achieve an adjustable thermal expansion coefficient of the negative thermal expansion composite material E.

In a third process, a composite filler G with a negative thermal expansion coefficient is prepared from raw materials including a negative thermal expansion material A and a zero thermal expansion material F under certain chemical reaction conditions, and the volume fractions of the two components, the negative thermal expansion material A and the zero thermal expansion material F, in the composite G can be adjusted to thereby achieve an adjustable thermal expansion coefficient of the negative thermal expansion composite material G.

The composite material prepared in the second or third processes described above can be used as a negative thermal expansion composite filler in the embodiment of the invention, and the components of the negative thermal expansion composite material prepared in the second or third method above will not be limited to the two components above which are taken as examples, but can alternatively be more than two components, and the embodiment of the invention will not be limited in this regard.

A composite filler which is the negative thermal expansion composite material prepared in the third method above will be described in details below.

First Embodiment

Figure 2:
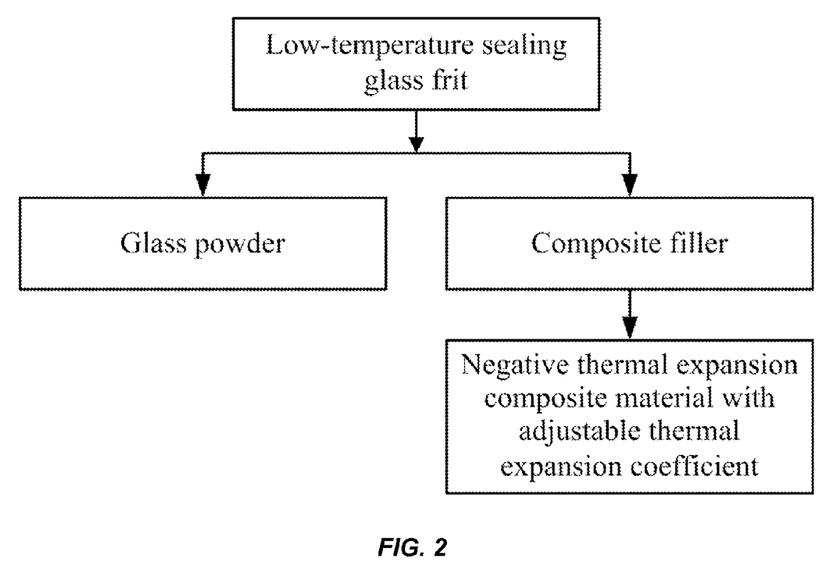
FIG. 2 illustrates a structural diagram of components of a low-temperature sealing glass frit according to an embodiment of the invention.

A low-temperature sealing glass frit according to an embodiment of the invention as illustrated in FIG. 2 includes a glass powder and a composite filler. The composite filler is a negative thermal expansion composite filler with an adjustable thermal expansion coefficient. The glass powder is typically made of one or more of $V_2O_5$, $TeO_2$, $Fe_2O_3$, $Co_2O_3$, $TiO_2$, $ZrO_2$, $ZnO$ and $K_2O$.

The composite filler according to this embodiment is a composite material prepared from a chemical reaction of a mixture of zirconium tungstate and silicon dioxide at high temperature, where zirconium tungstate is an isotropic negative thermal expansion material, and silicon dioxide is an amorphous silicon dioxide powder material which is a zero thermal expansion material. The isotropic negative thermal expansion material being heated will shrink with cubic symmetry in all of the three crystal axles at the same shrinkage coefficient which can be adjustable uniformly as a whole in respective directions and exhibit negative thermal expansibility in a wide temperature range. A composite phase of the composite filler according to this embodiment is a zirconium tungstate and silicon dioxide composite phase.

Figure 3:
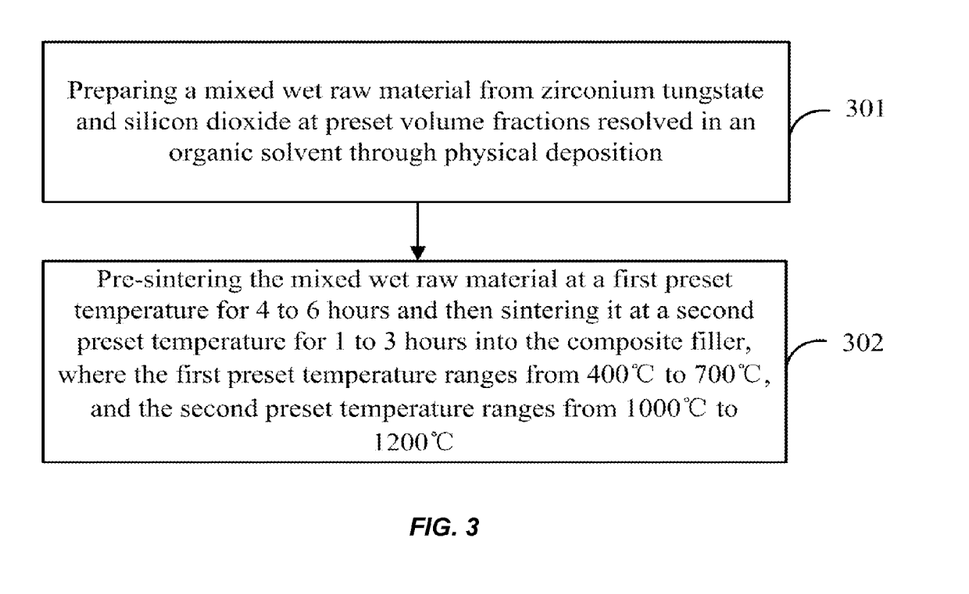
FIG. 3 illustrates a flow chart of a method for preparing a composite filler according to an embodiment of the invention.

In this embodiment, the composite filler is prepared from the chemical reaction between raw materials, zirconium tungstate and silicon dioxide at high temperature in the following particular operations as illustrated in FIG. 3:

Operation 301: preparing a mixed wet raw material from zirconium tungstate and silicon dioxide at preset volume fractions resolved in an organic solvent through a physical vapor deposition; and Operation 302: pre-sintering the mixed wet raw material at a first preset temperature for 4 to 6 hours and then sintering it at a second preset temperature for 1 to 3 hours into the composite filler, where the first preset temperature is in the range from 400° C. to 700° C., and the second preset temperature is in the range from 1000° C. to 1200° C.

With the method above, the volume fractions of zirconium tungstate and silicon dioxide in the composite filler can be adjusted to prepare the composite filler with a variable negative thermal expansion coefficient. For example, a 10×2×2 mm test sample is prepared in the flow of the method above, and an adjustable range from $-8.7 \times 10^{-6}/°$ C. to $0/°$ C. of the thermal expansion coefficient of the resulting composite filler is measured by a TMA (Thermo-Mechanical Analysis) in the range from $-20°$ C. to $80°$ C. at an incremental step of $5°$ C. per minute as depicted in Table 1, which shows the thermal expansion coefficient of the composite filler at different proportions.

TABLE 1

| Components | | | | | | |
|---|---|---|---|---|---|---|
| $ZrW_2O_8$ (Volume fractions (%)) | 100 | 80 | 60 | 40 | 20 | 0 |
| $SiO_2$ (Volume fractions (%)) | 0 | 20 | 40 | 60 | 80 | 100 |
| Thermal expansion coefficient ($10^{-7}/°$ C.) | −8.7 | −6.22 | −4.63 | −3.74 | −1.83 | 0 |

Figure 4A:
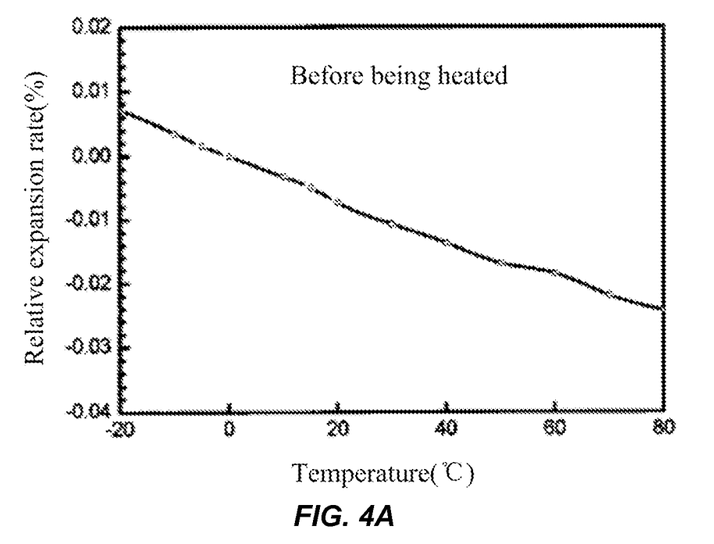
FIGS. 4A and 4B are graphs illustrating the respective thermal expansion of a composite filler before and after being heated according to an embodiment of the invention.
Figure 4B:
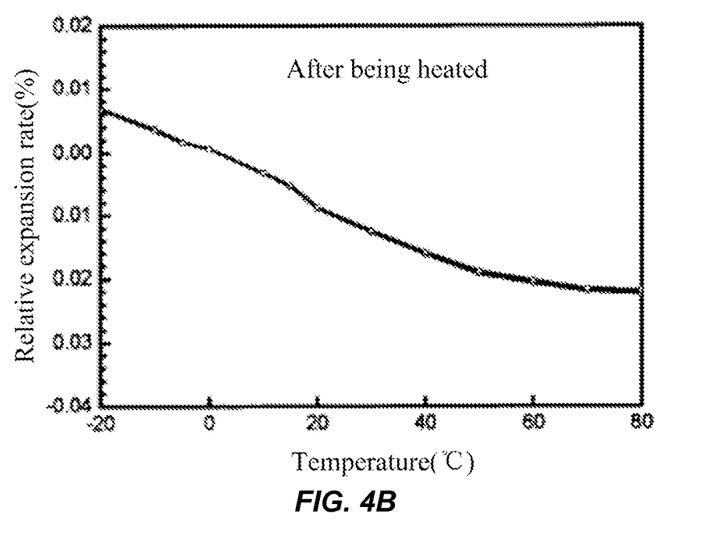

The experiments demonstrated that the negative thermal expansion composite material above with the adjustable thermal expansion coefficient according to the embodiment of the invention has a low thermal hysteresis. The thermal hysteresis of the composite material is tested by heating the test sample of the composite material above cyclically for more than 5 times and testing the extent to which a graph of thermal expansion before the composite material is heated (FIG. 4A) overlaps with the graph of thermal expansion after the composite material is heated (FIG. 4B). Results of the experiments demonstrated the graph of thermal expansion, before the composite material is heated cyclically, substantially overlaps with the graph of thermal expansion after the composite material is heated cyclically, which suggests a low thermal hysteresis of the composite material.

In the embodiment above, the thermal expansion coefficient of the negative thermal expansion composite material with the adjustable thermal expansion coefficient prepared from the raw materials, zirconium tungstate and silicon dioxide, is negative and decreases with an increasing volume fraction of zirconium tungstate and can be adjustable in the range of $-8.7 \times 10^{-6}/°$ C. to $0/°$ C.

A low-temperature sealing glass frit is prepared by mixing the composite filler above with glass powder, and oxide components of the low-temperature sealing glass frit prepared according to this embodiment include one or more of $V_2O_5$, $TeO_2$, $Fe_2O_3$, $Co_2O_3$, $TiO_2$, $ZrO_2$, ZnO and $K_2O$.

The mass fraction of the composite filler above in the low-temperature sealing glass frit can be adjusted so that the thermal expansion coefficient of the prepared low-temperature sealing glass frit can also be adjustable. For example, the glass powder is mixed with the composite filler above, and when the mass fraction of the composite filler is 40% and the mass fraction of the glass powder is 60%, a 5×5×5 cm test sample is made of the mixture in a conventional process and sintered, and then the thermal expansion coefficient of the low-temperature sealing glass frit is measured through Thermo-Mechanical Analysis (TMA) up to 600° C. at an incremental step 10° C. per minute resulting in Table 2. As can be apparent from Table 2, when the mass fraction of the glass powder is 60% and the mass fraction of the composite filler is 40%, the thermal expansion coefficient of the composite filler and thus the thermal expansion coefficient of the low-temperature sealing glass frit prepared therefrom can be adjustable. At the proportions as depicted in Table 2, the thermal expansion coefficient of the low-temperature sealing glass frit is adjustable in the range of $3 \times 10^{-6}/°$ C. to $10 \times 10^{-6}/°$ C. Table 2 shows the law of thermal expansion coefficient of low-temperature sealing glass frit varying with thermal expansion coefficient of composite filler.

TABLE 2

| Materials | | | | | | |
|---|---|---|---|---|---|---|
| Thermal expansion coefficient of composite filler ($10^{-7}/°$ C.) | −8.7 | −6.22 | −4.63 | −3.74 | −1.83 | 0 |
| Composite filler (mass fraction (%)) | 40 | 40 | 40 | 40 | 40 | 40 |
| Glass powder (mass fraction (%)) | 60 | 60 | 60 | 60 | 60 | 60 |
| Thermal expansion coefficient of glass frit ($10^{-7}/°$ C.) | 30-35 | 40-50 | 60-80 | 80-90 | 90-100 | >100 |

In order to determine the law of the thermal expansion coefficient of the low-temperature sealing glass frit varying with the mass fraction of the composite filler, one of the composite fillers above can be selected, and given the mass fraction of the composite filler in the low-temperature sealing glass frit and the mass fraction of the glass powder in the low-temperature sealing glass frit, test samples of the low-temperature sealing glass frit are made by mixing the glass powder and the composite filler at different proportions, and thermal expansion coefficients of the test samples of the low-temperature sealing glass frit are measured, respectively.

For example, a composite filler with a thermal expansion coefficient of $-3.74 \times 10^{-7}/°$ C. is selected taking both the characteristics and costs of $ZrW_2O_8$ and $SiO_2$ into account, and the mass fraction of the composite filler in the glass frit is varied (from 10% to 40%) so that the thermal expansion coefficient of the resulting low-temperature sealing glass frit decreases with an increasing mass fraction of the composite filler, and the thermal expansion coefficient of the low-temperature sealing glass frit can be adjusted in the range of $45 \times 10^{-7}/°$ C. to $81.7 \times 10^{-7}/°$ C. at different proportions particularly as depicted in Table 3, which shows the law of thermal expansion coefficient of low-temperature sealing glass frit varying with mass fraction of composite material.

TABLE 3

| Materials | | | | | | |
|---|---|---|---|---|---|---|
| Thermal expansion coefficient of composite filler ($10^{-7}/°$ C.) | −6.22 | −6.22 | −6.22 | −6.22 | −6.22 | −6.22 |
| Composite filler (mass fraction (%)) | 10 | 15 | 20 | 25 | 30 | 40 |
| Glass powder (mass fraction (%)) | 90 | 85 | 80 | 75 | 70 | 60 |

TABLE 3-continued

| Materials | | | | | | |
|---|---|---|---|---|---|---|
| Thermal expansion coefficient of glass frit ($10^{-7}$/° C.) | 81.7 | 73.5 | 66.4 | 58.7 | 51.6 | 45 |

In the embodiment, the negative thermal expansion composite material with an adjustable thermal expansion coefficient is a composite material prepared from the chemical reaction between zirconium tungstate which is an isotropic negative thermal expansion material, and silicon dioxide which is a zero thermal expansion material at high temperature, and the thermal expansion coefficient of the low-temperature sealing glass frit into which the composite material and the glass powder is mixed can be adjustable and decreases with an increasing mass fraction of the composite filler, so that the thermal expansion coefficient of the low-temperature sealing glass frit can match with the thermal expansion coefficient of the glass substrates packaging the OLED device to thereby improve the yield of the packaged OLED device, thus addressing such a problem in the related art, that the thermal expansion coefficient of the sealing glass frit is significantly different from the thermal expansion coefficient of the sealing glass substrate, due to which warping and breakage may occur when the sealing glass substrates are sealed by the sealing glass frit, or breakage may occur in the sealing glass substrates packaging the OLED device being illuminated by intensive light.

Second Embodiment

The components of the composite filler according to the first embodiment described above can be extended resulting in some other negative thermal expansion composite materials with an adjustable thermal expansion coefficient and low-temperature sealing glass frits with an adjustable thermal expansion coefficient, where the composite filler can be extended according to the components thereof at least as follows:

In a first supplementary embodiment, the composite filler is a composite filler resulting from a chemical reaction of a mixture of zirconium tungstate, silicon dioxide and cordierite at high temperature, and composite phases of the composite filler includes a zirconium tungstate and silicon dioxide composite phase, and a zirconium tungstate and cordierite composite phase.

In a second supplementary embodiment, the composite filler is a composite filler resulting from a chemical reaction of a mixture of zirconium tungstate, silicon dioxide and eucryptite at high temperature, and composite phases of the composite filler includes a zirconium tungstate and silicon dioxide composite phase, and a zirconium tungstate and eucryptite composite phase.

In a third supplementary embodiment, the composite filler is a composite filler resulting from a chemical reaction of a mixture of zirconium tungstate, silicon dioxide, cordierite and eucryptite at high temperature, and composite phases of the composite filler includes a zirconium tungstate and silicon dioxide composite phase, a zirconium tungstate and cordierite composite phase, and a zirconium tungstate and eucryptite composite phase.

Herein zirconium tungstate is an isotropic negative thermal expansion material, silicon dioxide is a zero thermal expansion material, and cordierite and eucryptite are anisotropic negative thermal expansion materials.

Figure 5:
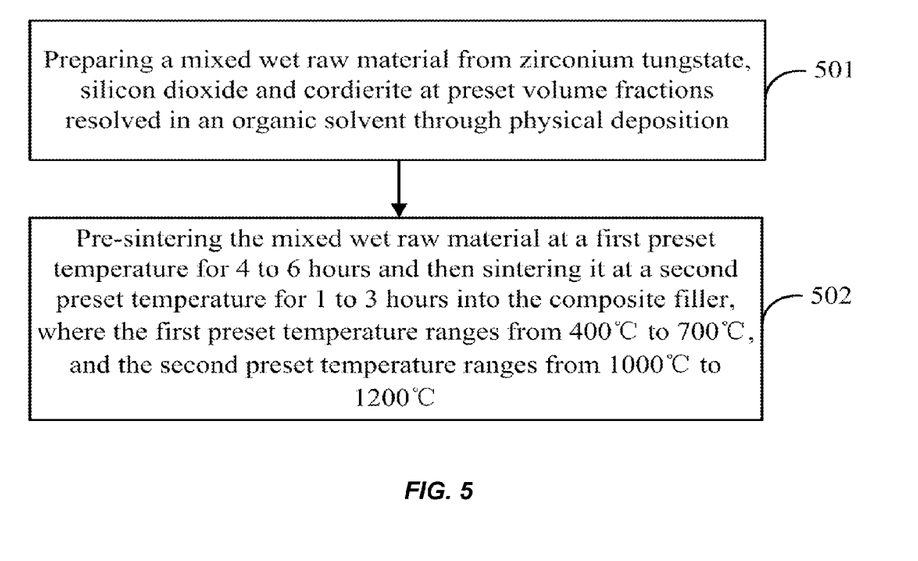
FIG. 5 illustrates a flow chart of a method for preparing a composite filler according to an embodiment of the invention.

Taking the composite filler according to the first supplementary embodiment as an example, the composite filler can be prepared in the following particular operations as illustrated in FIG. 5:

Operation 501: preparing a mixed wet raw material from zirconium tungstate, silicon dioxide and cordierite at preset volume fractions resolved in an organic solvent through physical deposition; and Operation 502: pre-sintering the mixed wet raw material at a first preset temperature for 4 to 6 hours and then sintering it at a second preset temperature for 1 to 3 hours into the composite filler, where the first preset temperature ranges from 400° C. to 700° C., and the second preset temperature ranges from 1000° C. to 1200° C.

The thermal expansion coefficient of the composite filler prepared in the above-described operations can be adjusted and will decrease with an increasing mass fraction of zirconium tungstate at a low proportion of the eucryptite or cordierite component.

A low-temperature sealing glass frit is prepared by mixing the composite filler prepared in the operations above with glass powder, and oxide components of the low-temperature sealing glass frit prepared according to this embodiment include one or more of $V_2O_5$, $TeO_2$, $Fe_2O_3$, $Co_2O_3$, $TiO_2$, $ZrO_2$, $ZnO$ and $K_2O$.

In this embodiment, the adjustable thermal expansion coefficient of the prepared low-temperature sealing glass frit can be achieved by adjusting the mass fraction of the composite filler in the mixture of the low-temperature sealing glass frit.

Also the thermal expansion coefficient of the low-temperature sealing glass frit decreases with an increasing mass fraction of the composite filler. Preferably the mass fraction of the composite filler in the glass frit ranges from 10% to 40%, and the mass fraction of the glass powder in the glass frit ranges from 60% to 90%, and the thermal expansion coefficient of the glass frit can be adjusted in the range of $3\times10^{-6}$/° C. to $10\times10^{-6}$/° C.

In the embodiment, the negative thermal expansion composite material with an adjustable thermal expansion coefficient is a composite material prepared from the chemical reaction among zirconium tungstate which is an isotropic negative thermal expansion material, silicon dioxide which is a zero thermal expansion material and eucryptite or cordierite which is a anisotropic negative thermal expansion material at high temperature, and the thermal expansion coefficient of the low-temperature sealing glass frit into which the composite material and the glass powder is mixed can be adjustable and decreases with an increasing mass fraction of the composite filler, so that the thermal expansion coefficient of the low-temperature sealing glass frit can match with the thermal expansion coefficient of the glass substrates packaging the OLED device to thereby improve the yield of the packaged OLED device, thus addressing such a problem in the related art, that the thermal expansion coefficient of the sealing glass frit is significantly different from the thermal expansion coefficient of the sealing glass substrate, due to which warping and breakage may occur when the sealing glass substrates are sealed by the sealing glass frit, or breakage may occur in the sealing glass substrates packaging the OLED device being illuminated by intensive light.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations within the scope of the present invention.

Evidently those skilled in the art can make various modifications and variations to the invention without departing from the spirit and scope of the invention. Thus the invention is also intended to encompass these modifications and variations thereto so long as the modifications and variations come into the scope of the appended claims and their equivalents.

What is claimed is:

1. A glass frit comprising:
    a glass powder; and
    a negative thermal expansion composite filler including a plurality of composite materials and having an adjustable thermal expansion coefficient to be selected from a plurality of thermal expansion coefficients corresponding to preset composition ratios among the plurality of composite materials when the composite materials are mixed to form the negative thermal expansion composite filler.

2. The glass frit according to claim 1, wherein the thermal expansion coefficient of the composite filler is adjustable in a range of $-8.7\times10^{-6}/°$ C. to $0/°$ C.

3. The glass frit according to claim 1, wherein the composite filler is a composite filler resulting from a chemical reaction of a mixture of an isotropic negative thermal expansion material and a zero thermal expansion material at high temperature.

4. The glass frit according to claim 3, wherein the isotropic negative thermal expansion material is zirconium tungstate, and the zero thermal expansion material is silicon dioxide.

5. A glass frit, comprising:
    a glass powder; and
    a negative thermal expansion composite filler having an adjustable thermal expansion coefficient,
    wherein the composite filler is a composite filler resulting from a chemical reaction of a mixture of an isotropic negative thermal expansion material and a zero thermal expansion material at high temperature; and
    wherein the mixture further comprises at least one of cordierite and eucryptite.

6. The glass frit according to claim 5, wherein the composite filler comprises at least one of a zirconium tungstate and silicon dioxide composite phase, a zirconium tungstate and cordierite composite phase, or a zirconium tungstate and eucryptite composite phase.

7. The glass frit according to claim 1 wherein a mass fraction of the composite filler is in a range from 10% to 40%, and a mass fraction of the glass powder is in a range from 60% to 90%.

8. The glass frit according to claim 2, wherein a mass fraction of the composite filler is in a range from 10% to 40%, and a mass fraction of the glass powder is in a range from 60% to 90%.

9. The glass frit according to claim 3, wherein a mass fraction of the composite filler is in a range from 10% to 40%, and a mass fraction of the glass powder is in a range from 60% to 90%.

10. The glass frit according to claim 4, wherein a mass fraction of the composite filler is in a range from 10% to 40%, and a mass fraction of the glass powder is in a range from 60% to 90%.

11. The glass frit according to claim 5, wherein a mass fraction of the composite filler is in a range from 10% to 40%, and a mass fraction of the glass powder is in a range from 60% to 90%.

12. The glass frit according to claim 6, wherein a mass fraction of the composite filler is in a range from 10% to 40%, and a mass fraction of the glass powder is in a range from 60% to 90%.

13. The glass frit according to claim 1, further comprising oxide components comprising one or more of $V_2O_5$, $TeO_2$, $Fe_2O_3$, $Co_2O_3$, $TiO_2$, $ZrO_2$, $ZnO$ and $K_2O$.

14. The glass frit according to claim 2, further comprising oxide components comprising one or more of $V_2O_5$, $TeO_2$, $Fe_2O_3$, $Co_2O_3$, $TiO_2$, $ZrO_2$, $ZnO$ and $K_2O$.

15. The glass frit according to claim 3, further comprising oxide components comprising one or more of $V_2O_5$, $TeO_2$, $Fe_2O_3$, $Co_2O_3$, $TiO_2$, $ZrO_2$, $ZnO$ and $K_2O$.

16. The glass frit according to claim 4, further comprising oxide components comprising one or more of $V_2O_5$, $TeO_2$, $Fe_2O_3$, $Co_2O_3$, $TiO_2$, $ZrO_2$, $ZnO$ and $K_2O$.

17. The glass frit according to claim 5, further comprising oxide components comprising one or more of $V_2O_5$, $TeO_2$, $Fe_2O_3$, $Co_2O_3$, $TiO_2$, $ZrO_2$, $ZnO$ and $K_2O$.

18. The glass frit according to claim 6, further comprising oxide components comprising one or more of $V_2O_5$, $TeO_2$, $Fe_2O_3$, $Co_2O_3$, $TiO_2$, $ZrO_2$, $ZnO$ and $K_2O$.

19. The glass frit according to claim 1, wherein a thermal expansion coefficient of the glass frit is adjustable in a range of $3\times10^{-6}/°$ C. to $10\times10^{-6}/°$ C.

20. A method for preparing a composite filler used in a low-temperature sealing glass frit comprising a glass powder, wherein the composite filler is a negative thermal expansion composite filler with an adjustable thermal expansion coefficient, the method comprising:
    preparing a mixed wet raw material from a zirconium tungstate and a silicon dioxide at preset volume fractions resolved in an organic solvent through physical deposition; or
    preparing a mixed wet raw material from a zirconium tungstate and a silicon dioxide at preset volume fractions, and at least one of cordierite and eucryptite resolved in the organic solvent through physical deposition; and
    pre-sintering the mixed wet raw material at a first preset temperature for 4 to 6 hours; and then sintering the mixed wet raw material at a second preset temperature for 1 to 3 hours into the composite filler, wherein the first preset temperature is in a range from 400° C. to 700° C., and the second preset temperature is in a range from 1000° C. to 1200° C.

* * * * *